(12) United States Patent
Crume (10) Patent No.: US 11,505,504 B2
(45) Date of Patent: Nov. 22, 2022

(54) NON-OXIDE INORGANIC PORE-FORMERS FOR CORDIERITE CERAMIC ARTICLES

(71) Applicant: Corning Incorporated, Corning, NY (US)

(72) Inventor: Gregg William Crume, Canandaigua, NY (US)

(73) Assignee: Corning Incorporated, Corning, NY (US)

( * ) Notice: Subject to any disclaimer, the term of this patent is extended or adjusted under 35 U.S.C. 154(b) by 249 days.

(21) Appl. No.: 16/866,864

(22) Filed: May 5, 2020

(65) Prior Publication Data

US 2020/0354280 A1 Nov. 12, 2020

Related U.S. Application Data

(60) Provisional application No. 62/846,056, filed on May 10, 2019.

(51) Int. Cl.
*C04B 38/02* (2006.01)
*C04B 38/00* (2006.01)

(52) U.S. Cl.
CPC .......... *C04B 38/02* (2013.01); *C04B 38/0009* (2013.01); *C04B 2235/3826* (2013.01)

(58) Field of Classification Search
CPC ............... C04B 38/02; C04B 38/0009; C04B 2235/3826; C04B 2235/3229;
(Continued)

(56) References Cited

U.S. PATENT DOCUMENTS 4,297,140 A * 10/1981 Paisley ................. F01N 3/0222
428/116
4,340,403 A * 7/1982 Higuchi ............. B01D 46/2407
428/117
(Continued)

FOREIGN PATENT DOCUMENTS

CN 208720782 U * 4/2019 ......... C04B 33/1305

OTHER PUBLICATIONS

Holz et al; "Fabrication of Low-to-Zero Shrinkage Reaction-Bonded Mullite Composites", Journal of the European Ceramic Society 16 (1996) 255-26.
(Continued)

*Primary Examiner* — Noah S Wiese
(74) *Attorney, Agent, or Firm* — Joseph M. Homa (57) ABSTRACT

Cordierite-forming batch mixtures including one or more non-oxide inorganic source materials or materials as pore-formers are provided. Non-oxide inorganic materials, such a non-oxide silicon material that includes at least one of silicon carbide, silicon, or silicon nitride, may be added to cordierite-forming batch mixtures as at least a partial replacement for conventional inorganic pore-formers. Non-oxide inorganic pore-formers may provide an increase in pore volume while having a reduced coefficient of thermal expansion impact as compared with conventional pore-formers. Cordierite-forming mixtures as disclosed herein may additionally include rare-earth catalysts and alkaline-earth materials that may enhance the pore-forming effect of non-oxide inorganic pore-formers without significant exothermic reactions or the production of emissions that may require additional processing treatments.

21 Claims, 7 Drawing Sheets

(58) Field of Classification Search
CPC ... C04B 2235/3227; C04B 2111/00793; C04B 2111/0081; C04B 35/195
See application file for complete search history.

(56) References Cited

U.S. PATENT DOCUMENTS

| | | | |
|---|---|---|---|
| 6,024,899 | A | 2/2000 | Peng et al. |
| 7,541,303 | B2 | 6/2009 | Addiego et al. |
| 7,651,755 | B2* | 1/2010 | Yoshida .................. B01J 35/04 |
| | | | 428/116 |
| 7,914,875 | B2 | 3/2011 | Jiang et al. |
| 8,765,049 | B2 | 7/2014 | Bronfenbrenner et al. |
| 8,926,875 | B2 | 1/2015 | Spetseris et al. |
| 2002/0077247 | A1 | 6/2002 | Bender et al. |

OTHER PUBLICATIONS

She et al; "Mullitization and Densification of Y2O3-Doped Reaction-Bonded Mullite Ceramics With Different Compositions" Materials Chemistry and Physics 76 (2002) 8891.

Wu et al; "Fabrication and Properties of Low-Shrinkage Reaction-Bonded Mullite", J Am Ceram Soc 74 [ I 0 ] 2460-63 (1991.

Wu et al; "Reaction Bonding and Mechanical Properties of Mullite/ Silicon Carbide Composites"; J. Am. Ceram Soc 77 (11)2898-904 (1994.

* cited by examiner

| | Master Batch * | |
|---|---|---|
| | Raw Material | Parts by weight |
| Weight % of total inorganics | Calcined clay | 20.11% |
| | Kaolin | 14.53% |
| | Alumina A-1000 SGD | 10.88% |
| | Boehmite | 11.85% |
| | Talc | 42.63% |
| Weight % of super additions to inorganics | Methocel F240 | 6.21% |
| * Crystalline silica was not added to master batch | | |

FIG. 3

| | Material | A | B | C | D | E | F |
|---|---|---|---|---|---|---|---|
| Weight % of total inorganics | Master Batch | 93.62% | 94.40% | 94.88% | 95.05% | 95.65% | 94.09% |
| | Crystalline $SiO_2$ | 6.38% | 3.91% | 2.41% | 1.91% | 0.00% | 3.40% |
| | Green SiC | 0.00% | 1.68% | 2.71% | 3.05% | 4.35% | 2.01% |
| | $La_2O_3$ 99% | 0.00% | 0.00% | 0.00% | 0.00% | 0.00% | 0.50% |
| Weight % of super additions to inorganics | Oleic acid | 0.78% | 0.79% | 0.79% | 0.79% | 0.80% | 0.78% |
| | polyalphaolefin | 6.17% | 6.22% | 6.25% | 6.26% | 6.30% | 6.20% |
| | Batch Water | 30.36% | 30.61% | 30.77% | 30.82% | 31.02% | 30.51% |

| | | Batch Weights (weight %) | | | | | | | | | |
|---|---|---|---|---|---|---|---|---|---|---|---|
| | Material | G | H | I | J | K | L | M | N | O |
| Weight % of total inorganics | Green SiC SA=10 | 2.26% | 2.27% | 4.60% | 4.59% | 0.00% | 0.00% | 4.58% | 0.00% | 2.20% |
| | crystalline SiO$_2$ | 3.40% | 3.41% | 0.00% | 0.00% | 6.74% | 6.71% | 0.00% | 6.73% | 6.60% |
| | CeO$_2$ | 0.50% | 0.25% | 0.00% | 0.25% | 0.00% | 0.50% | 0.51% | 0.25% | 0.00% |
| | Talc | 40.16% | 40.26% | 40.83% | 40.72% | 39.91% | 39.71% | 40.62% | 39.81% | 39.03% |
| | A-1000 SGD alpha alumina | 10.20% | 10.23% | 10.37% | 10.35% | 10.14% | 10.09% | 10.32% | 10.11% | 9.92% |
| | Kaolin | 13.62% | 13.66% | 13.85% | 13.81% | 13.54% | 13.47% | 13.78% | 13.50% | 13.24% |
| | Calcinated clay | 18.75% | 18.79% | 19.06% | 19.01% | 18.63% | 18.54% | 18.96% | 18.58% | 18.22% |
| | Boehmite | 11.11% | 11.14% | 11.29% | 11.26% | 11.04% | 10.98% | 11.24% | 11.01% | 10.80% |
| Weight % of super additions to inorganics | F240 hydroxypropylmethycellulose | 5.43% | 5.44% | 5.52% | 5.50% | 5.39% | 5.37% | 5.49% | 5.38% | 5.28% |
| | Oleic acid | 0.82% | 0.83% | 0.84% | 0.84% | 0.82% | 0.82% | 0.83% | 0.82% | 0.80% |
| | Polyalphaolefin | 5.03% | 5.04% | 5.11% | 5.10% | 5.00% | 4.97% | 5.08% | 4.98% | 4.89% |
| | Batch Water | 32.17% | 32.25% | 32.70% | 32.62% | 31.97% | 31.81% | 32.54% | 31.89% | 31.27% |

NON-OXIDE INORGANIC PORE-FORMERS FOR CORDIERITE CERAMIC ARTICLES

This application claims the benefit of priority under 35 U.S.C. § 119 of U.S. Provisional Application No. 62/846,056 filed on May 10, 2019, the content of which is incorporated herein by reference in its entirety.

BACKGROUND

This disclosure relates generally to the manufacture of porous ceramic articles of cordierite, such as honeycomb bodies for use as substrates for catalytic material and/or plugged or sealed honeycomb bodies for use as particulate filters for exhaust treatment.

Exhaust produced by the combustion of liquid fuels (e.g., diesel or gasoline) can be effectively treated by catalytic converter substrates and/or particulate filters such as wall-flow particulate filters. Filters and catalyst supports in these applications may be refractory, thermal shock resistant, and offer low resistance to exhaust gas flow. Particulate filters and substrates for these applications advantageously may be fabricated of porous ceramic material that are light in weight and may be provided in the form of a honeycomb structure, which in the case of a particulate filter may include a plurality of plugs that seal certain channels.

The art continues to seek improved batch mixtures for forming ceramic articles and related devices having improved performance characteristics without impairing manufacturability and reliability of such devices, and being capable of overcoming challenges associated with conventional devices.

SUMMARY

Disclosed herein are cordierite-forming batch mixtures that utilize one or more non-oxide inorganic components or materials, such as non-oxide silicon materials, as pore-formers. A non-oxide silicon material such as silicon carbide (SiC), including high surface area SiC, can be added to a cordierite-forming batch mixture as at least a partial replacement for inorganic oxide pore-formers, such as particulate silica ($SiO_2$) particles, and preferably the batch mixture comprises a source of fluorine, without requiring any other modifications to the batch mixture. The fluorine is preferably present in the batch mixture in an amount sufficient to catalyze the decomposition of SiC. The fluorine may be supplied by impurities of the remaining batch ingredients, such as contained in the inorganic components or materials, like talc or rare earth oxide. Preferably, the fluorine is present in the batch mixture in an amount greater than 50 ppm with respect to the total weight of inorganics. In a reactive sintering process for forming a ceramic cordierite article, SiC can undergo a reaction during the firing process that results in an expansion of the cordierite article. Such a reaction can lead to an increase in pore volume while having a reduced impact to coefficient of thermal expansion (CTE) in comparison to the use of other pore-formers. In certain embodiments, rare-earth catalysts, such as lanthanum or cerium, as well as an optional source of fluorine, may be added to the cordierite-forming batch mixture to enhance the pore forming effect of the SiC on the final porous cordierite-containing ceramic article. In certain embodiments, the use of non-oxide silicate additives in conjunction with alkali-earth and/or rare-earth catalysts may enhance the pore-forming effect of the SiC without significant exothermic reactions or the production of emissions that would require additional treatment of flue gas generated by a ceramic firing process. Pore-formers including non-oxide silicon materials as disclosed herein provide increased pore formation compared with other pore-formers. In this regard, the addition of such pore-formers has reduced impact on batch rheology, since smaller quantities can be used to enhance porosity of resulting ceramic articles.

In one aspect, a batch mixture for forming a porous cordierite material comprises a plurality of inorganic source materials including a magnesium source, an aluminum source, and a silicon source in amounts sufficient to form a reactively sintered cordierite phase. The batch mixture also comprises a pore-former material comprising a non-oxide silicon material. In certain embodiments, the non-oxide silicon material comprises particles of at least one of SiC, silicon (Si), or silicon nitride (SiN). The non-oxide silicon material may comprise SiC particles. The SiC particles may have an average specific surface area in a range of from 10 meters-squared per gram ($m^2/g$) to 15 $m^2/g$. In certain embodiments, the pore-former material further comprises an oxide of silicon. In certain embodiments, the batch mixture further comprises a rare-earth catalyst that includes at least one of a lanthanum source or a cerium source. In certain embodiments, the plurality of inorganic source materials comprises at least one of talc, clay, calcined clay, kaolin clay, boehmite, or alumina. In certain embodiments, the aluminum source comprises at least one of clay, calcined clay, kaolin clay, alpha-alumina, a transition alumina, boehmite, or aluminum hydroxide. In certain embodiments, the magnesium source comprises at least one of talc, calcined talc, clay, hydrated magnesium silicate, magnesium oxide, or magnesium hydroxide. In certain embodiments, the batch mixture further comprises an alkaline-earth metal source configured to promote decomposition of the pore-former material. In certain embodiments, the alkaline-earth metal source comprises a source of at least one of magnesium (Mg), calcium (Ca), or strontium (Sr). Preferably, the batch mixture further comprises fluorine present in the batch mixture in an amount greater than 50 ppm with respect to the total weight of inorganics. Enough fluroine may contained in any of the batch constituents, or instead, or in addition, separate source of trace amounts of fluorine may be added to the batch mixture, in order to provide an overall enhanced catalytic effect on the decomposition of SiC.

In another aspect, a method for fabricating a porous cordierite article comprises mixing a plurality of inorganic source materials with a pore-former material to provide a cordierite-forming batch mixture, wherein the plurality of inorganic source materials includes a magnesium source, an aluminum source, and a silicon source, and the pore-former material comprises a non-oxide silicon material. The method also comprises firing the cordierite-forming batch mixture under conditions suitable for forming a porous cordierite article from the cordierite-forming batch mixture. In certain embodiments, the method further comprises extruding the cordierite-forming batch mixture through an extrusion die before said firing of the cordierite-forming batch mixture. In certain embodiments, the porous cordierite article comprises a honeycomb body comprising a plurality of cell channels that are at least partially defined by intersecting cell walls of the porous cordierite article. In certain embodiments, the plurality of cell channels comprises cross-sectional shapes of at least one of rectangular, square, hexagonal, polygonal, circular, or elliptical. In certain embodiments, the non-oxide silicon material comprises at least one of SiC, Si, or SiN. In certain embodiments, the non-oxide silicon material is oxidized during said firing of the cordierite-forming batch mixture. In certain embodiments, the pore-former material further comprises an oxide of silicon. In certain embodiments, the cordierite-forming batch mixture further comprises a rare-earth catalyst that includes at least one of a lanthanum source or a cerium source. In certain embodiments, the cordierite-forming batch mixture further comprises an alkaline-earth metal source that is configured to promote decomposition of the pore-former material.

In another aspect, any one or more aspects or features described herein may be combined with any one or more other aspects or features for additional advantage.

Additional features and advantages will be set forth in the detailed description which follows, and in part will be readily apparent to those skilled in the art. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

Relative terms such as "below" or "above" or "upper" or "lower" or "horizontal" or "vertical" may be used herein to describe a relationship of one element or region to another element or region as illustrated in the accompanying drawings. It will be understood that these terms and those discussed above are intended to encompass different orientations of the device in addition to the orientation depicted in the drawings.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Ceramic honeycomb structures may be fabricated by plasticizing a ceramic powder batch mixture to form a wet extrudate source material, extruding the source material through a honeycomb extrusion die to form honeycomb extrudate, and cutting, drying, and firing the extrudate to produce ceramic honeycomb bodies. These ceramic honeycomb bodies may be used as ceramic catalyst supports in motor vehicle exhaust systems, and as catalyst supports and wall-flow particulate filters for removing soot and other particulates from engine exhaust streams. For wall-flow filtering applications, an important factor for filter performance is the porosity of the ceramic walls that form the honeycomb body. The porosity of the ceramic walls can influence filter performance characteristics such as back pressure, heat capacity, and filtration efficiency. Cordierite ceramics (i.e., cordierite phase crystalline matrices) can be used in products such as catalytic converters due to their low thermal expansion and refractory character. The cordierite phase can be formed by a reaction of precursors, such as reaction sintering. A cordierite-forming batch mixture can be prepared by combining inorganic source materials and pore-formers, among other precursors. A pore-former material may be a particulate material that is consumed or otherwise altered during formation of a ceramic matrix to obtain a desired porosity that differs from a value that would be obtained without the pore-former. During drying and/or firing of a batch mixture, pores may be formed in the resulting cordierite body when the pore-formers either diffuse into the surrounding matrix of inorganic source materials or when the pore-formers are burned off. Inorganic relic pore-formers, such as talc or silica, may diffuse into the surrounding matrix of inorganic source materials, thereby forming relic pores in the resulting cordierite body. Relic pore-formers are limited by the amount of relic pores they are able to produce. Fugitive pore-formers, such as organic starch materials, may evaporate or vaporize by combustion during firing or drying or heating, thereby leaving pores in the resulting cordierite body. Fugitive pore-formers may necessitate increased firing times, as well as require treatments of flue gases produced during firing. Engineered pore-formers designed to address such firing issues can be prohibitively expensive and/or may be too fragile to be extruded, such as by twin screw extruder, to form honeycomb bodies.

Disclosed herein is the use of one or more non-oxide inorganic components or materials, such as non-oxide silicon materials, as pore-formers in a cordierite-forming mixture. A non-oxide silicon material such at least one of silicon carbide (SiC), silicon (Si), and silicon nitride (SiN, including $Si_xN_y$, e.g., $Si_3N_4$), can be added to a cordierite-forming batch mixture as at least a partial replacement for oxide inorganic pore-formers, such as particulate silica ($SiO_2$) particles. In a reactive sintering process for forming a cordierite article, SiC can undergo a reaction during the firing process that results in an expansion of the cordierite article. Such a reaction can lead to an increase in pore volume while having a reduced impact to coefficient of thermal expansion (CTE) as compared with other pore-formers. The oxidation of SiC during the firing process does not produce large exothermic reactions that would require long firing cycles and/or a low oxygen firing atmosphere to manage crack-producing thermal variations. Additionally, no organic emissions are produced from non-oxide silicon pore-formers that would otherwise require lower flammable limit (LFL) controls during firing. Organic pore-formers, such as various starches, can also pose explosive hazards during storage and transport. In certain embodiments, rare-earth catalysts such as source of lanthanum or cerium, may be added to the cordierite-forming mixture to enhance the pore forming effect of the SiC on the final porous cordierite-containing ceramic article. In certain embodiments, the use of non-oxide silicate additives in conjunction with alkaline-earth and/or rare-earth catalysts may enhance the pore forming effect of the SiC without significant exothermic reactions or the production of emissions that may require flue gas after treatment. Pore-formers including non-oxide silicon materials are disclosed herein that provide increased pore formation compared with other pore-formers. In this regard, the addition of such pore-formers has reduced impact on batch rheology since smaller quantities can be used to enhance porosity in resulting ceramic articles.

In various embodiments, ceramic bodies or articles are disclosed with improved porosities. Related fabrication processes for forming such ceramic bodies are also disclosed. For certain applications, embodiments are disclosed that can provide low pressure drop and high filtration efficiency, for example when implemented in a filter body such as a honeycomb structure body comprised of a matrix of walls. Ceramic bodies described herein, including ceramic honeycombs bodies, may preferably be primarily cordierite in phase in certain embodiments. The cordierite phase may be formed by a reaction of precursors, such as reaction sintering. A cordierite-forming batch mixture may be prepared by combining inorganic source materials and pore-formers, among other precursors. The inorganic source materials may include one or more materials including magnesium (Mg) sources, aluminum (Al) sources and silicon (Si) sources, thereby providing one or more forming sources of magnesia, alumina, and silica for forming cordierite. Exemplary inorganic source materials include talc, calcined talc, clay, hydrated magnesium silicate ($Mg_3Si_4O_{10}(OH)_2$), magnesium oxide (MgO) and magnesium hydroxide $Mg(OH)_2$ for the magnesium source material; clay, calcined clay, kaolin clay, alpha-alumina ($Al_2O_3$), a transition alumina such a gamma-alumina or rho-alumina, boehmite, aluminum hydroxide (aluminum trihydrate), and mixtures thereof for the aluminum source material; and quartz, cristobalite, non-crystalline silica such as fused silica or a sol-gel silica, zeolite, diatomaceous silica, and combinations thereof for the silicon source material.

"Pore-formers" or "pore-former" or "pore-former material" as used herein refers to a particulate material which may be consumed or otherwise altered during formation of ceramic materials to obtain a desired, usually larger porosity and/or desired median pore diameter than would otherwise be obtained without the pore-former.

Other precursors for a cordierite-forming batch mixture may include forming and/or extrusion aids such as plasticizers, lubricants, binders, and solvent vehicles. Methocel is an exemplary binder, and water is an exemplary solvent vehicle. The inorganic source materials are blended together with the forming aids to form a homogeneous plastic batch mixture. The plastic batch mixture may then be formed into a desired shape, such as a honeycomb green body, that is optionally dried, and then fired in a furnace to form the final structure or article. For a porous honeycomb article, such forming may be accomplished by an extrusion process that includes extruding the plastic mixture from a twin screw or ram extruder through an extrusion die.

As used herein, the term "extrudate" refers to plasticized extrusion source material (also known as batch material or mixture) extruded through a die to form axially extending intersecting walls with channels arranged therebetween. Extrudate channels can have cross-sections of uniform or varying hydraulic diameters of various shapes, such as rectangular (e.g., square), hexagonal, other polygonal, circular, elliptical, other curved shapes and the like, and combinations thereof. Extrusion may entail a continuous process (e.g., utilizing a screw extruder, a twin-screw extruder, or the like) or entail a discontinuous process (e.g., utilizing a ram extruder or the like). In an extruder, an extrusion die can be coupled with a discharge port of an extruder barrel, such as at an end of the extruder barrel. An extrusion die can be preceded by other structures, such as a generally open cavity, a screen, and/or a homogenizer or the like to facilitate the formation of a steady plug-type flow front before the extrusion source material reaches the extrusion die.

Extrudate may include a co-extruded, integrally formed, outer peripheral surface (or skin) that typically extends in a longitudinal direction parallel to an axial direction of formation of the extrudate. An outer periphery of extrudate may have various cross-sectional shapes, such as circular, elliptical, polygonal, etc., and combinations thereof, and such shapes may be either symmetric or asymmetric in character. After plasticized extrusion source material is extruded through a die to form extrudate, the extrudate may be cut, dried, and fired to form a porous ceramic honeycomb body or porous ceramic honeycomb body segment. These ceramic honeycomb bodies may be used as ceramic catalyst supports in motor vehicle exhaust systems, and as catalyst supports and wall-flow particulate filters for removing soot and other particulates from engine exhaust streams.

Figure 1:
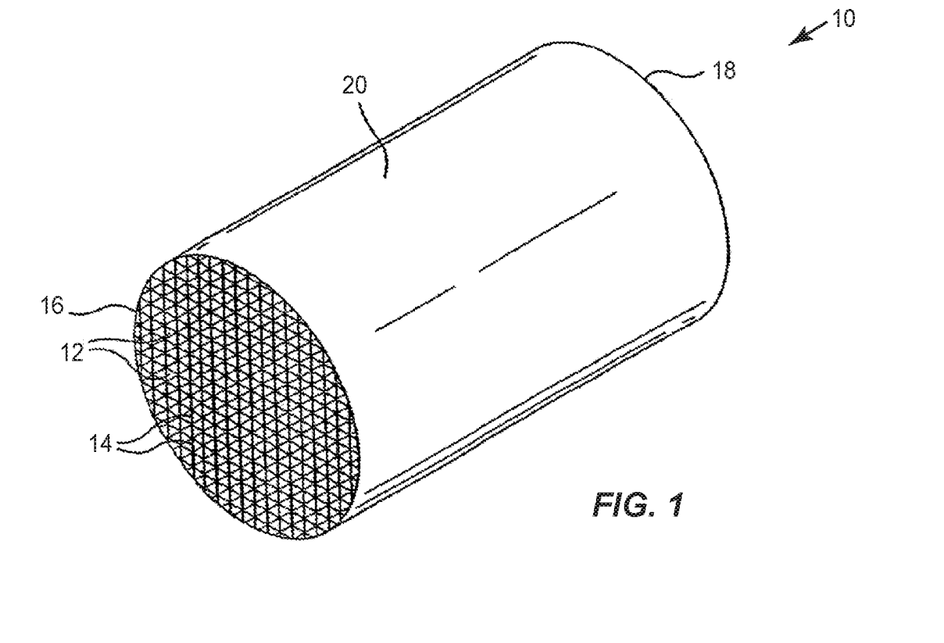
FIG. 1 is a perspective view of an exemplary honeycomb body of porous cordierite material producible from batch mixtures and fabrication methods as disclosed herein.

FIG. 1 is a perspective view of an exemplary honeycomb body 10 that may be produced from batch mixtures and/or fabrication methods as disclosed herein. The honeycomb body 10 has been extruded to form a cellular honeycomb structure having a plurality of cell channels 12 that are generally parallel to one another, at least partially defined by intersecting cell walls 14 that extend from a first end 16 to a second end 18 of the honeycomb body 10. The honeycomb body 10 may be referred to as a substrate in certain applications. For porous ceramic bodies, such as the cordierite body described above, the intersecting cell walls 14 are also porous. In certain embodiments, the honeycomb body 10 may include an extruded smooth skin 20 formed about the honeycomb body 10, although this is optional and may be formed in later processing. Depending on the application and the extrusion process, the cell channels 12 may comprise various cross-sectional shapes, including generally square, rectangular, triangular, octagonal, hexagonal, polygonal, circular, elliptical, or combinations thereof. The term "honeycomb structure" as used herein is defined as a connected structure of longitudinally-extending cells formed of cell walls, having a generally repeating pattern therein.

Figure 2:
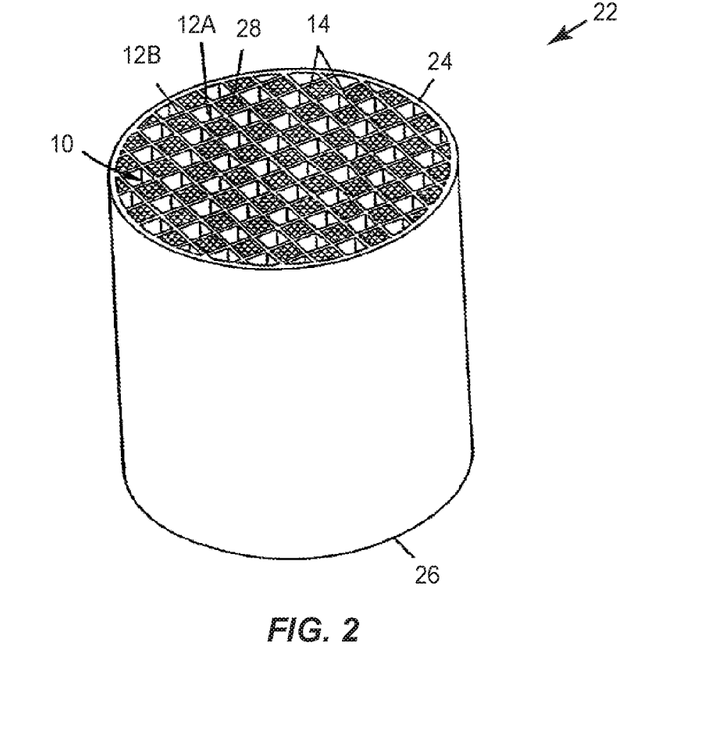
FIG. 2 is a perspective view of an exemplary honeycomb filter comprising porous cordierite material producible from batch mixtures and fabrication methods as disclosed herein.

FIG. 2 is a perspective view of an exemplary honeycomb filter 22 that may be produced from batch mixtures and/or fabrication methods as disclosed herein. The honeycomb filter 22 includes the honeycomb body 10 as previously described in FIG. 1 with an inlet end 24 and an outlet end 26. In certain filter embodiments, the porous cell walls 14 of the honeycomb body 10 define inlet cell channels 12A and outlet cell channels 12B. At least some of the inlet and outlet cell channels 12A, 12B may include porous end plugs 28. In certain embodiments, the porous end plugs 28 comprise a paste or other material having the same or similar composition to that of the honeycomb filter 22. In certain embodiments, a portion of the inlet cell channels 12A are plugged at the outlet end 26, and a portion of the outlet cell channels 12B are plugged at the inlet end 24. The respective plugged inlet channels 12A are arranged adjacent to the plugged outlet cell channels 12B to promote wall flow through the cell walls 14. In this manner, each of the cell channels 12A, 12B may only be plugged at one of the inlet end 24 or the outlet end 26. In certain embodiments, every other cell on a given end face is plugged in a checkered pattern as illustrated in FIG. 2, although any other suitable arrangements of porous end plugs 28 may be employed.

This plugging configuration allows for more intimate contact between an exhaust stream and the porous cell walls 14. In this manner, exhaust stream may flow into the honeycomb filter 22 through the inlet cell channels 12A at the inlet end 24, then through the porous cell walls 14, and out of the honeycomb filter 22 through the outlet cell channels 12B at the outlet end 26. Filters of the type herein described are known as "particulate" or "wall flow" filters since the flow paths resulting from alternate channel plugging require the exhaust being treated to flow through the porous cell walls 14 prior to exiting the honeycomb filter 22. Thus, such porous ceramic filters are useful for filtering particulate material from an exhaust, for example, removing/filtering soot from a diesel exhaust.

Figure 3:
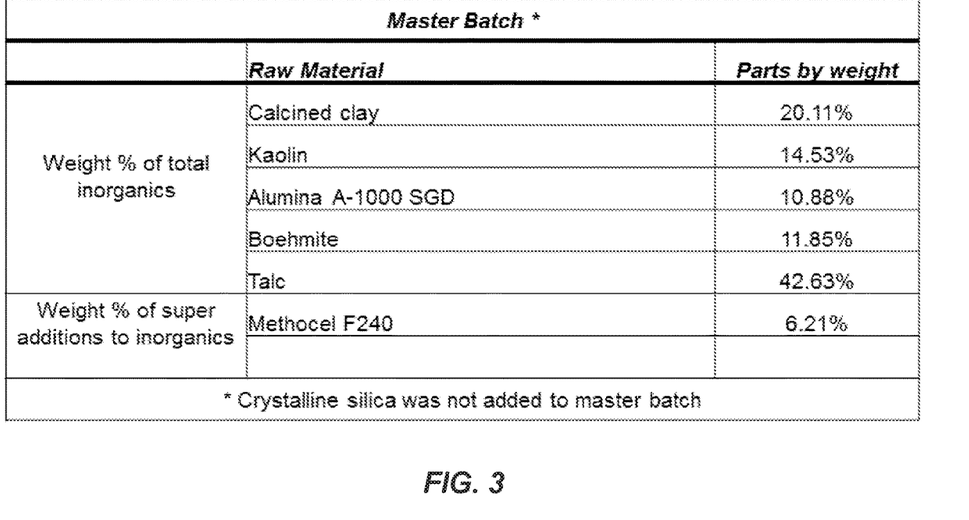
FIG. 3 is a table identifying constituents of a master batch of a cordierite-forming mixture that was used as a base material for experimental samples.
Figure 4:
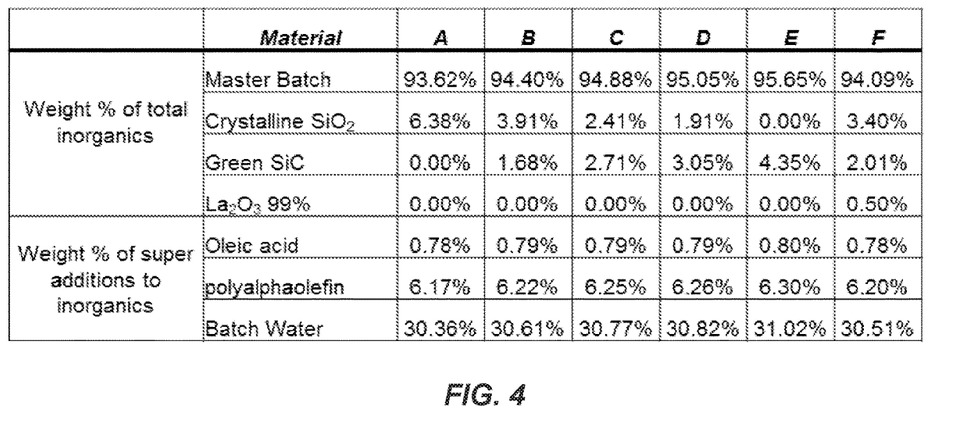
FIG. 4 is a table identifying constituents (in weight %) and permitting comparison of batch compositions for experimental samples A-F with varying compositions of pore-formers according to embodiments disclosed herein.
Figure 5:
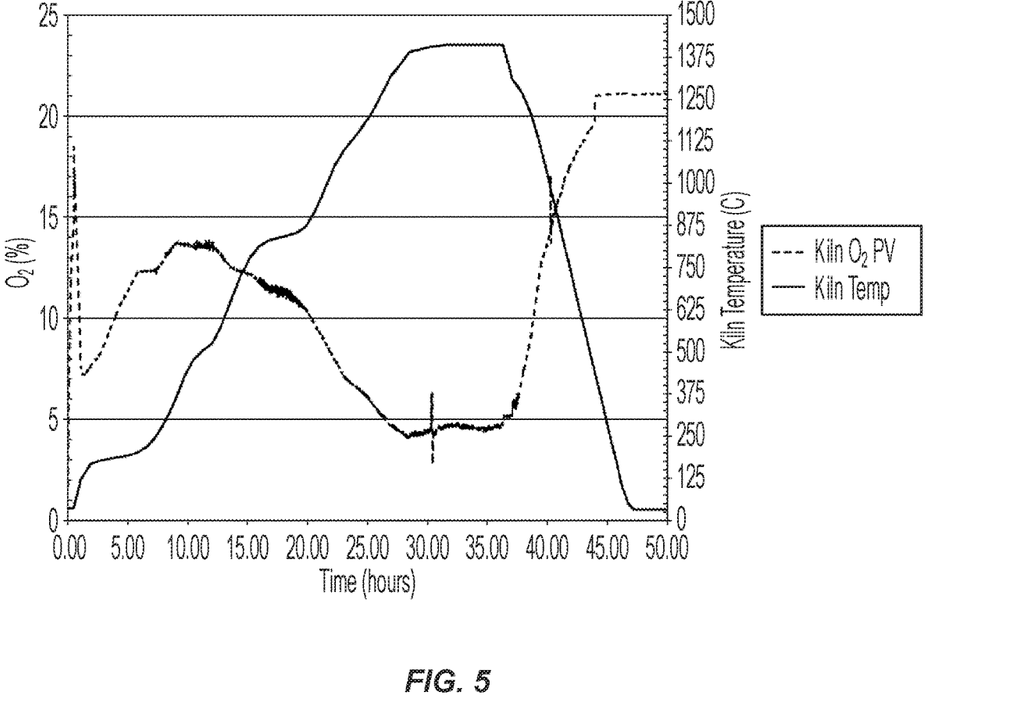
FIG. 5 provides superimposed plots of oxygen percentage versus time and kiln temperature versus time, illustrating a firing schedule for each of the samples A-F of FIG. 4.

In order to demonstrate the advantages of pore-formers that include non-oxide silicon materials, various experimental samples were made from a cordierite-forming mixture that produced stoichiometric cordierite bodies. In the various experimental samples, at least a portion of particulate pore-formers of a silicon oxide material or an oxide of silicon ($SiO_2$ in these examples) were replaced with equivalent amounts of pore-formers comprising non-oxide silicon materials (SiC in these examples) in order to keep the final fired solid phase chemistry of all samples equivalent. In this regard, several experimental samples were formed with differing compositions of pore-formers in which the amounts of $SiO_2$ and SiC were varied. A master batch of a cordierite-forming mixture was initially formed and used for each of the experimental samples, such that pore-former compositions were the only differences between samples. FIG. 3 is a table identifying constituents of the master batch of the cordierite-forming mixture that was used as a base material for the experimental samples. The raw materials and their respective parts by weight % of total inorganics and weight % of super additions to the inorganics for the master batch are shown in FIG. 3. The master batch included a mixture of inorganic source materials including a magnesium source, an aluminum source, and a silicon source as indicated by the first five rows of raw materials. Additionally, a binder material of Methocel F240 was also added to the master batch. The master batch was mixed in a Littleford mixer and used as the base material for the subsequent experimental samples described below and shown in FIG. 4. For a cordierite-forming mixture, a composition could additionally include particulate oxide pore-formers of $SiO_2$ with a parts per weight of about 6.38; however, this portion of particulate silica was omitted from the master batch so that pore-former compositions could be varied in the experimental samples. FIG. 4 is a table identifying constituents (in weight %) of total organics and of super addition to inorganics, and permitting comparison of batch compositions for experimental samples A-F with varying compositions of pore-formers according to embodiments disclosed herein. Each of the samples A-F include the same amounts of the master batch, extrusion aids (oleic acid and polyalphaolefin), and batch water. The relative amounts of pore-formers were varied among the samples A-F. Crystalline silica was used as an oxide pore-former for a source of particulate $SiO_2$. SiC particles with a specific surface area of 15 meters-squared per gram ($m^2/g$) were used as a non-oxide silicon material pore-former for a source of SiC. For comparison purposes, sample A included exclusively particulate $SiO_2$ for pore-formers. Additionally, samples B, C, D, and F included varying amounts of particulate $SiO_2$ and SiC, while sample E only included SiC as pore-formers. The SiC replaced equivalent moles of particulate $SiO_2$ in the formulations so the resulting chemistry of the fired parts remained constant. Each of the samples A-F were mixed and plasticized in a Brabender mixer for 6 minutes, and subsequently extruded on a ram extruder to produce one-inch diameter, 400 cells per square inch cellular parts. FIG. 5 provides superimposed plots of oxygen percentage versus time and kiln temperature versus time, illustrating a firing schedule employed for each of the samples A-F of FIG. 4. As illustrated, the x-axis represents the firing time in hours, while the primary y-axis represents oxygen content of the kiln and the secondary y-axis represents temperature in degrees Celsius of the kiln during the firing sequence.

Figure 6:
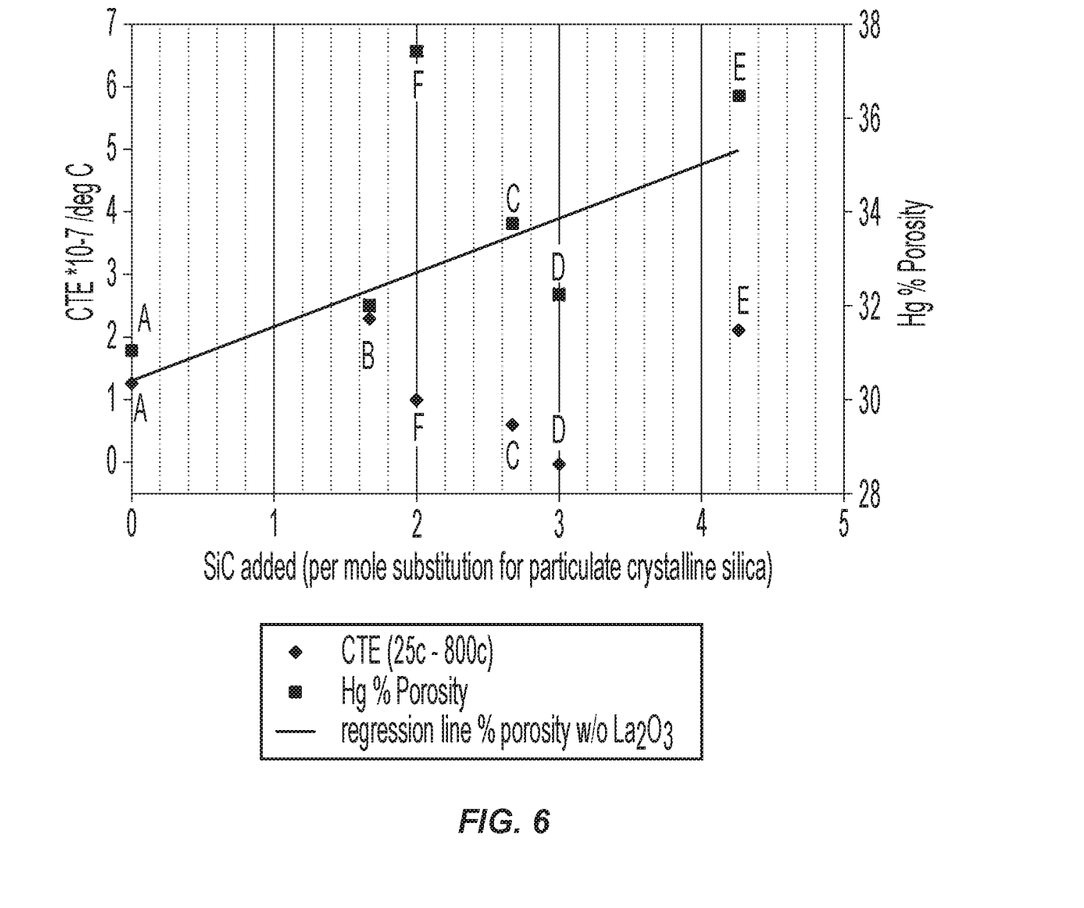
FIG. 6 is a comparison plot illustrating changes to coefficient of thermal expansion (CTE) and porosity based on increasing amounts of silicon oxide (SiC) pore-formers for the samples A-F of FIG. 4.

The fired samples A-F were subsequently core drilled and measured on a mercury (Hg) porosimeter to determine the percent porosity values. Additionally, the fired samples A-F were measured for CTE from 25C-800C. FIG. 6 is a comparison plot illustrating changes to CTE and porosity based on increasing amounts of SiC of the samples A-F of FIG. 4. In FIG. 6, the x-axis represents the added quantity of SiC that is substituted for particulate crystalline silica ($SiO_2$) for the samples A-F of FIG. 4, and the plotted data points are labeled with their respective sample number A-F. The primary y-axis represents the CTE measurement described above and the secondary y-axis represents the Hg porosity measurement described above. As illustrated by the regression line in FIG. 6, the addition of 15 $m^2/g$ SiC increases the porosity proportionally for the each of the samples A-E from a SiC value of 0 (sample A) to a SiC value of 4.26 (sample E). Notably, the addition of the rare-earth catalyst ($La_2O_3$) for sample F in combination with an added SiC value of 2.0 produces the highest porosity value (about 37.5 Hg % porosity) of any of the samples, which represents an increase of at least 6% over sample A (about 31.5 Hg % porosity).

Figure 7:
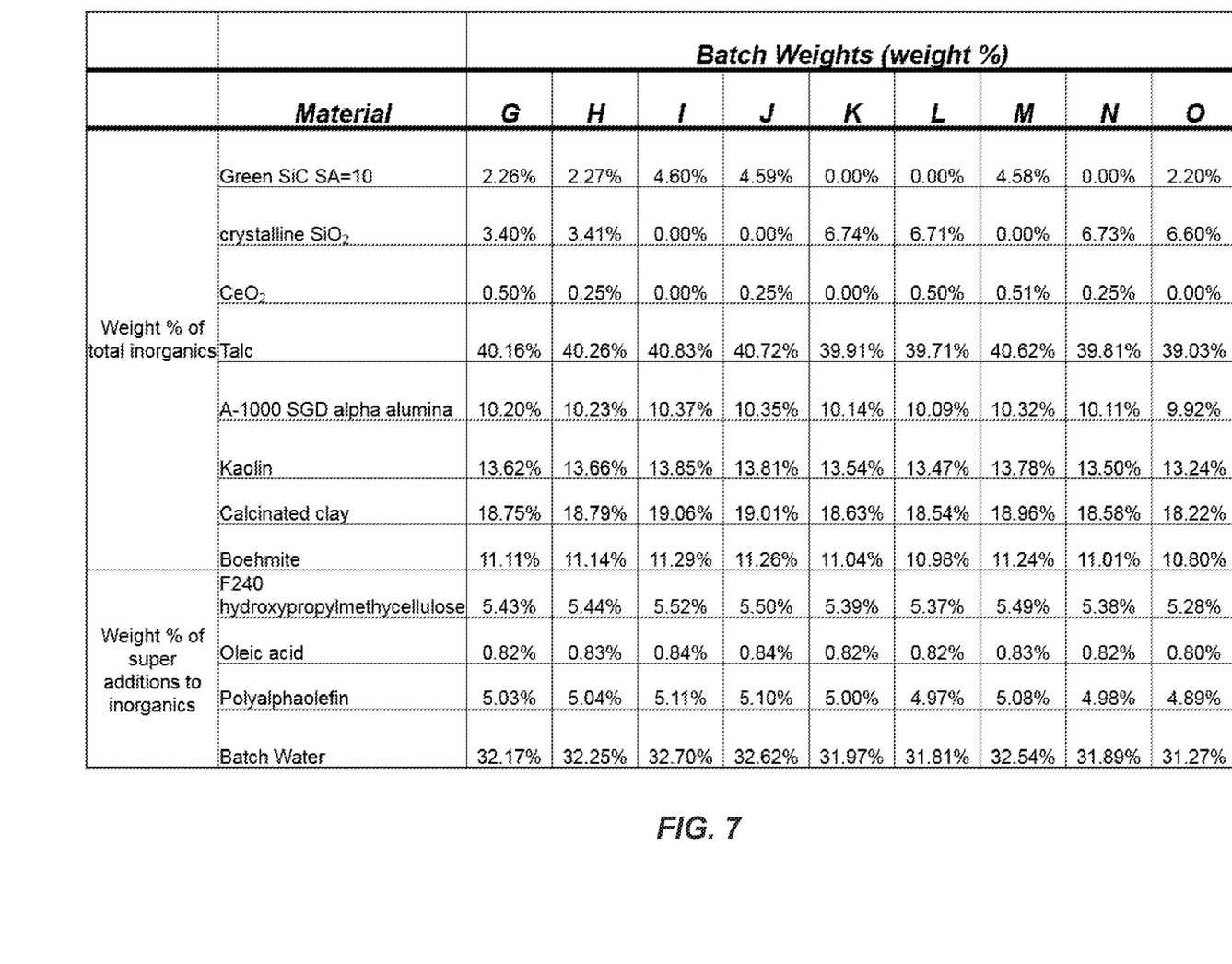
FIG. 7 is a table identifying constituents and permitting comparison of batch compositions for experimental samples G-O with varying compositions of pore-formers according to embodiments disclosed herein.

Additional experimental samples were produced from a cordierite-forming mixture that included SiC with a lower specific surface area as a pore-former as well as varying amounts of a rare-earth catalysts. FIG. 7 is a table identifying constituents and permitting comparison of batch compositions (in weight %) for experimental samples G-O with varying compositions of pore-formers according to embodiments disclosed herein. For the non-oxide silicon material source for pore-formers, green silicon carbide powder with a specific surface area of 10 $m^2/g$ was used for the SiC source to provide a comparison with the higher surface area SiC used in the samples A-F of FIG. 4. As illustrated in the table of FIG. 7, the amounts of SiC, $SiO_2$, and ceric oxide ($CeO_2$) were varied, while the other components or precursors of the cordierite-forming mixture were kept the same for the experimental samples G-O. The SiC replaced equivalent moles of particulate $SiO_2$ in the formulation so the resulting chemistry of the fired parts remained constant. $CeO_2$ was selected as the rare-earth catalyst for the samples G, H, J, and L-N as a lower-cost alternative to the $La_2O_3$ used for sample F of FIG. 4. In certain embodiments, the rare-earth catalyst can be any source of a rare-earth metal, including but not limited to a cerium source such as $CeO_2$, a lanthanum source such as $La_2O_3$, and combinations thereof. Samples G-O were produced on a twin screw extruder and CTE and porosity measurements were completed after firing.

Figure 8:
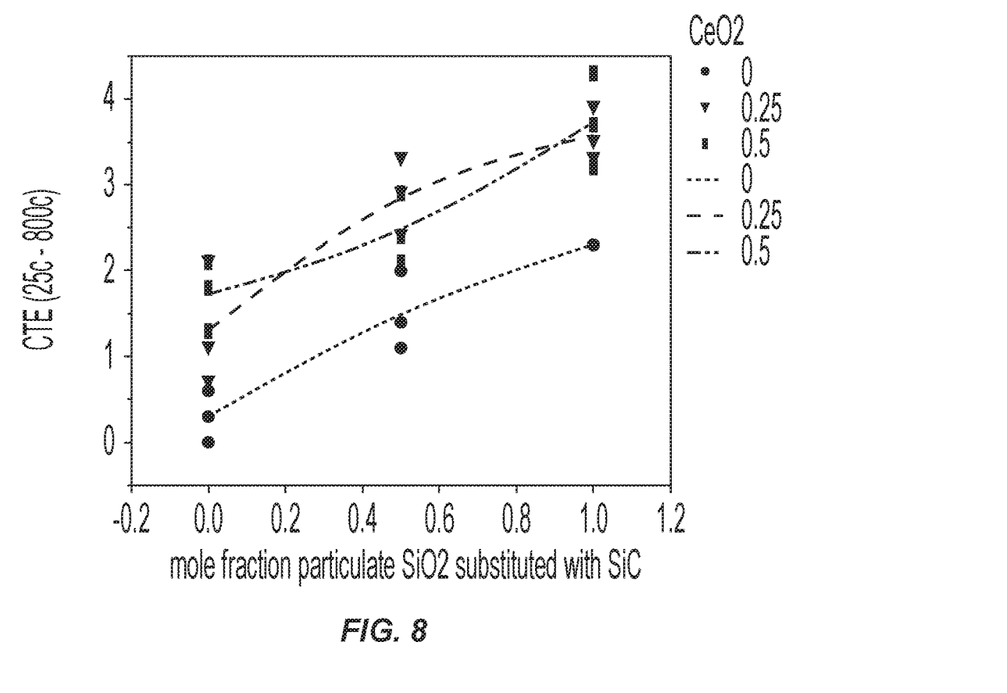
FIG. 8 is a comparison plot illustrating changes to CTE based on increasing amounts of SiC and varying amounts of ceric oxide ($CeO_2$) for each of the samples G-O of FIG. 7.
Figure 9:
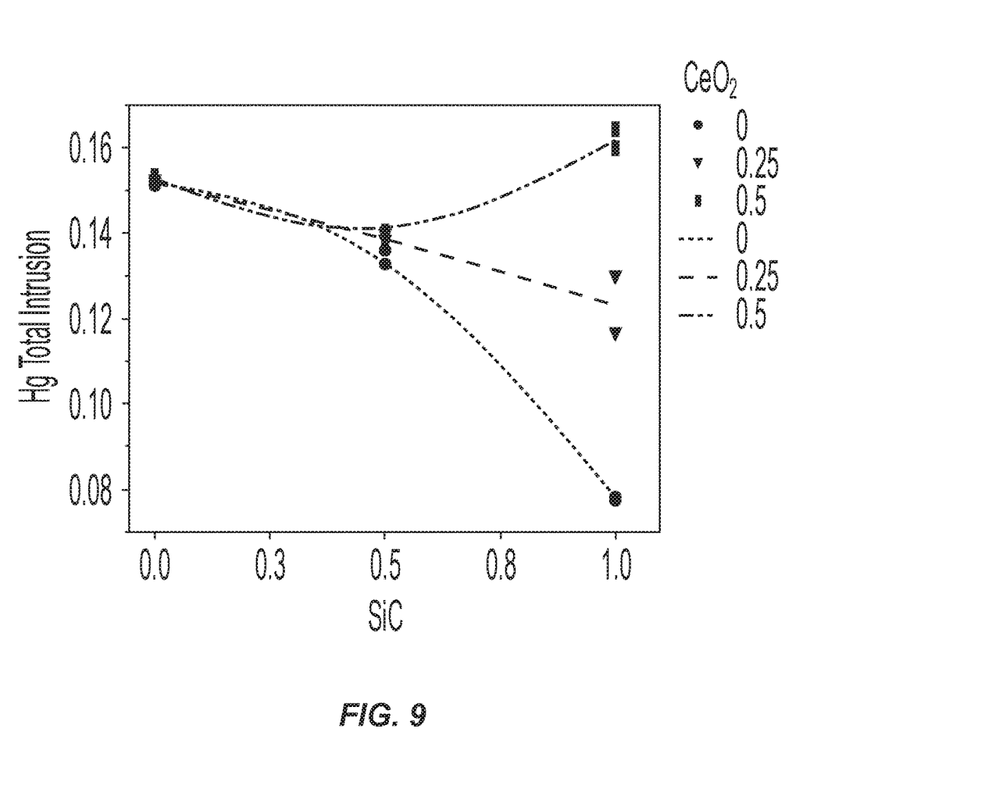
FIG. 9 is a comparison plot illustrating porosimeter measurements based on increasing amounts of SiC and varying amounts of $CeO_2$ for each of the samples G-O of FIG. 7.

FIG. 8 is a comparison plot illustrating changes to CTE based on increasing amounts of SiC and varying amounts $CeO_2$ for of the samples G-O of FIG. 7. In FIG. 8, the x-axis represents the added quantity or mole fraction of SiC that is substituted for $SiO_2$, and the y-axis represents the CTE measurement described. Data points are labeled to indicate the varying amounts of $CeO_2$. As illustrated, the CTE increased with increasing amounts of SiC for the samples G-O. FIG. 9 is a comparison plot illustrating Hg porosimeter measurements based on increasing amounts of SiC and varying amounts $CeO_2$ for of the samples G-O of FIG. 7. In FIG. 9, the x-axis represents the added quantity or mole fraction of SiC that is substituted for $SiO_2$, and the y-axis represents the porosity measurement as previously described in FIG. 6. As illustrated, no substantial porosity improvements are shown with increasing amounts of SiC; however, the porosity did show relatively higher values with increased $CeO_2$ catalysts, particularly for SiC values of 1.0. In view of the CTE and porosity plots shown in FIG. 8 and FIG. 9, the SiC with lower surface area (10 $m^2/g$) may not have fully reacted under the firing conditions used. Debinding chamber thermogravimetric analysis (TGA) indicated reaction of the SiC in a 15% $O_2$ firing environment. In this manner, SiC particles having a higher surface area may be advantageously used to allow a wider range or variation in firing conditions of cordierite-forming mixtures.

In certain embodiments disclosed herein, an alkaline-earth material may be added to cordierite-forming mixtures to promote decomposition of pore-formers that include non-oxide silicon materials such as SiC, among others. The alkaline-earth material may include one or more sources of, Mg, calcium (Ca), and strontium (Sr) or combinations thereof in certain embodiments. An exemplary Mg source may include Talc, where Mg becomes available once the Talc starts to de-hydroxylate. As illustrated in the tables of FIGS. 3, 4, and 7, each of the experimental samples A-O as previously described included Talc. In this regard, cordierite-forming mixtures are disclosed that include both the alkali-earth materials to promote decomposition of SiC and the rare-earth catalysts as previously described.

Figure 10:
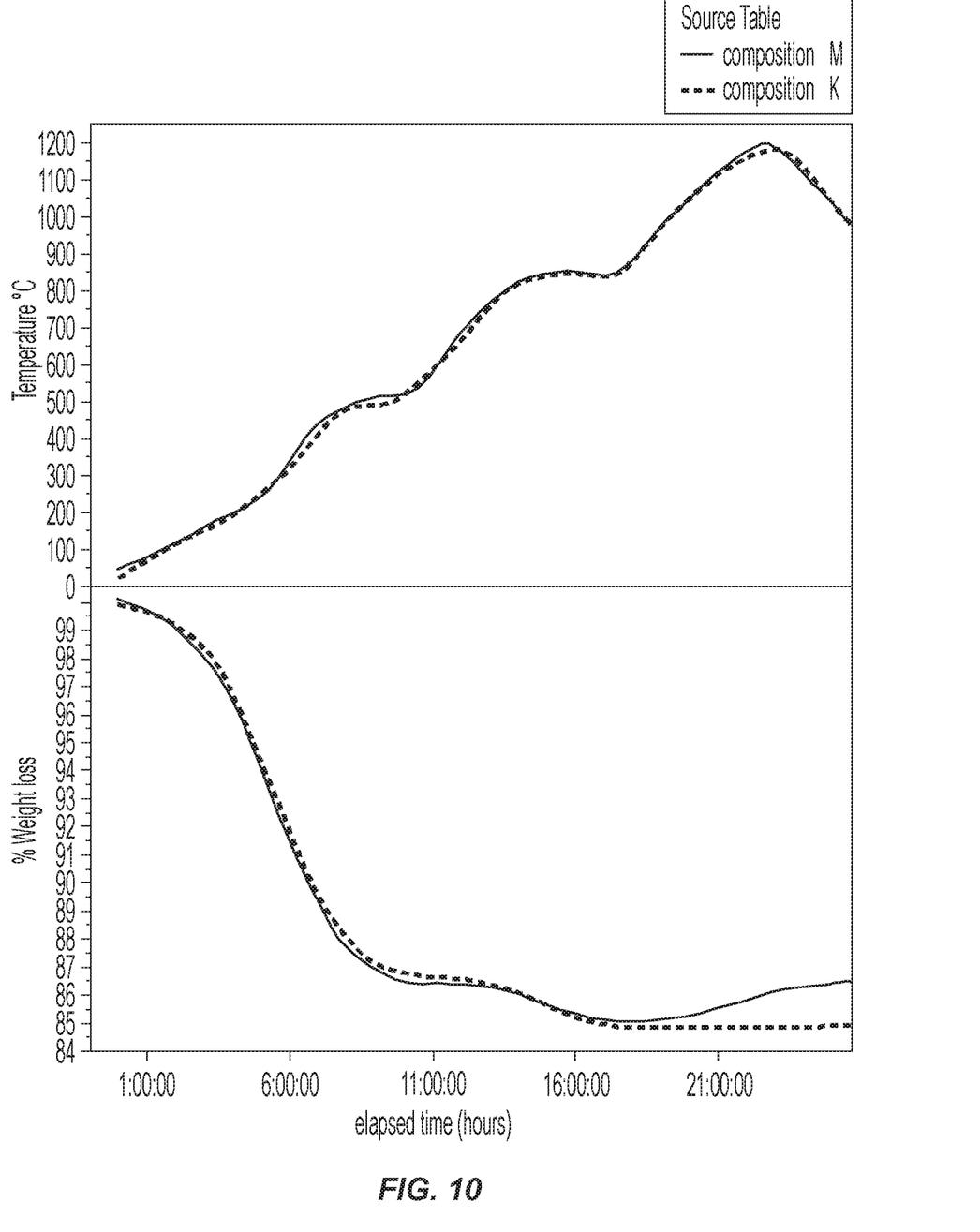
FIG. 10 is a comparison plot illustrating thermogravimetric analysis (TGA) of the samples M and K of FIG. 7 during firing.

FIG. 10 is a comparison plot illustrating TGA of the samples M and K of FIG. 7 during firing. In FIG. 10, the x-axis represents elapsed firing time in hours, and the y-axis is split to represent both the firing temperature in ° C. (top portion) and the % weight loss (bottom portion) for each of the sample compositions M and K. As shown in the table of FIG. 7, sample M included SiC that fully replaced $SiO_2$ for the pore-former and additionally included the rare-earth material $CeO_2$. Sample K, which did not include SiC or $CeO_2$, was plotted as a comparative example with sample M. As illustrated, sample M shows a weight gain at a temperature of about 800° C., indicating oxidation of SiC once the Talc starts to de-hydroxylate. In this manner, a non-oxide silicon material may be oxidized during the firing of the cordierite-forming batch mixture.

Technical benefits that may be provided by embodiments of the present disclosure include one or more of the following: several cost advantages over typical pore-formers currently used in cordierite ceramics; oxidation of non-oxide silicon materials such as SiC does not produce a large exotherm requiring long firing cycles and/or a low oxygen firing atmosphere to manage thermal variation in the ceramic article for crack prevention; organic emissions are reduced or avoided which otherwise would require LFL control during firing; organic pore-formers such as starch can pose an explosive hazard during storage and transport, while non-oxide silicon materials such as SiC may not present an explosive hazard and may not require special handling and storage procedures; and the addition of small quantities of non-oxide silicon materials such as SiC to the batch mixture can have minimal impact on the batch rheology especially as compared to the use of organic pore-formers such as unmodified starch. In some embodiments of the present disclosure, an increase of at least 6% in pore volume was achieved with only partial substitution of SiC for $SiO_2$ pore-formers and with the addition of a rare-earth catalyst.

Those skilled in the art will appreciate that other modifications and variations can be made without departing from the spirit or scope of the invention. Since modifications, combinations, sub-combinations, and variations of the disclosed embodiments incorporating the spirit and substance of the invention may occur to persons skilled in the art, the invention should be construed to include everything within the scope of the appended claims and their equivalents.

What is claimed is:

1. A batch mixture for forming a porous cordierite material, the batch mixture comprising:
   a plurality of inorganic source materials including a magnesium source, an aluminum source, and a silicon source in amounts sufficient to form a reactively sintered cordierite phase; and
   a pore-former material comprising a non-oxide silicon material comprising silicon carbide particles, wherein the silicon carbide particles have an average specific surface area in a range of from 10 meters-squared per gram ($m^2/g$) to 15 $m^2/g$.

2. The batch mixture of claim 1, wherein the non-oxide silicon material comprises particles of at least one of silicon carbide, silicon, or silicon nitride.

3. The batch mixture of claim 1, wherein the pore-former material further comprises an oxide of silicon.

4. The batch mixture of claim 1, further comprising a rare-earth catalyst that includes at least one of a lanthanum source or a cerium source.

5. The batch mixture of claim 1, further comprising 50 ppm or more of fluorine.

6. The batch mixture of claim 1, wherein the plurality of inorganic source materials comprises at least one of talc, clay, calcined clay, kaolin clay, boehmite, or alumina.

7. The batch mixture of claim 1, wherein the aluminum source comprises at least one of clay, calcined clay, kaolin clay, alpha-alumina, a transition alumina, boehmite, or aluminum hydroxide.

8. The batch mixture of claim 1, wherein the magnesium source comprises at least one of talc, calcined talc, clay, hydrated magnesium silicate, magnesium oxide, or magnesium hydroxide.

9. The batch mixture of claim 1, further comprising an alkaline-earth metal source configured to promote decomposition of the pore-former material.

10. The batch mixture of claim 8, wherein the alkaline-earth metal source comprises a source of at least one of magnesium, calcium, or strontium.

11. A method for fabricating a porous cordierite article, the method comprising: mixing a plurality of inorganic source materials with a pore-former material to provide a cordierite-forming batch mixture, wherein the plurality of inorganic source materials includes a magnesium source, an aluminum source, and a silicon source, and the pore-former material comprises a non-oxide silicon material; and
   firing the cordierite-forming batch mixture under conditions suitable for forming a porous cordierite article from the cordierite-forming batch mixture;
   wherein the non-oxide silicon material is oxidized during said firing of the cordierite-forming batch mixture.

12. The method of claim 11, further comprising extruding the cordierite-forming batch mixture through an extrusion die before said firing of the cordierite-forming batch mixture.

13. The method of claim 12, wherein the porous cordierite article comprises a honeycomb body comprising a plurality of cell channels that are at least partially defined by intersecting cell walls of the porous cordierite article.

14. The method of claim 13, wherein the plurality of cell channels comprises crosssectional shapes of at least one of rectangular, square, triangular, octagonal, hexagonal, polygonal, circular, or elliptical.

15. The method of claim 11, wherein the non-oxide silicon material comprises at least one of silicon carbide, silicon, or silicon nitride.

16. The method of claim 11, wherein the pore-former material further comprises an oxide of silicon.

17. The method of claim 11, wherein the cordierite-forming batch mixture further comprises a rare-earth catalyst that includes at least one of a lanthanum source or a cerium source.

18. The method of claim 11, wherein the cordierite-forming batch mixture further comprises an alkaline-earth metal source that is configured to promote decomposition of the pore-former material.

19. A batch mixture for forming a porous cordierite material, the batch mixture comprising:
   a plurality of inorganic source materials including a magnesium source, an aluminum source, and a silicon source in amounts sufficient to form a reactively sintered cordierite phase; and
   a pore-former material comprising a non-oxide silicon material, wherein the pore-former material further comprises an oxide of silicon.

20. A batch mixture for forming a porous cordierite material, the batch mixture comprising:
   a plurality of inorganic source materials including a magnesium source, an aluminum source, and a silicon source in amounts sufficient to form a reactively sintered cordierite phase;
   50 ppm or more of fluorine, and
   a pore-former material comprising a non-oxide silicon material.

21. A method for fabricating a porous cordierite article, the method comprising: mixing a plurality of inorganic source materials with a pore-former material to provide a cordierite-forming batch mixture, wherein the pore-former material further comprises an oxide of silicon, wherein the plurality of inorganic source materials includes a magnesium source, an aluminum source, and a silicon source, and the pore-former material comprises a non-oxide silicon material; and
   firing the cordierite-forming batch mixture under conditions suitable for forming a porous cordierite article from the cordierite-forming batch mixture.

* * * * *

UNITED STATES PATENT AND TRADEMARK OFFICE
CERTIFICATE OF CORRECTION

PATENT NO. : 11,505,504 B2
APPLICATION NO. : 16/866864
DATED : November 22, 2022
INVENTOR(S) : Gregg William Crume It is certified that error appears in the above-identified patent and that said Letters Patent is hereby corrected as shown below:

In the Claims

In Column 12, Line 6, in Claim 14, delete "crosssectional" and insert -- cross-sectional --.

Signed and Sealed this
First Day of August, 2023

Katherine Kelly Vidal
*Director of the United States Patent and Trademark Office*